United States Patent
Lippoldt et al.

(10) Patent No.: US 7,029,040 B2
(45) Date of Patent: Apr. 18, 2006

(54) LOCKING DEVICE OF A CLOSURE WITH A HOUSING

(75) Inventors: Roland Lippoldt, Engelsdorf (DE); Rüdiger Uhlendorf, Dransfeld (DE); Hans-Dieter Baudisch, Leizpig (DE)

(73) Assignee: Eppendorf AG, Hamburg (DE)

( * ) Notice: Subject to any disclaimer, the term of this patent is extended or adjusted under 35 U.S.C. 154(b) by 313 days.

(21) Appl. No.: 09/814,229

(22) Filed: Mar. 21, 2001

(65) Prior Publication Data

US 2001/0024039 A1    Sep. 27, 2001

(30) Foreign Application Priority Data

Mar. 22, 2000 (DE) ................. 100 15 010

(51) Int. Cl.
*E05C 3/06* (2006.01)

(52) U.S. Cl. .................. 292/201; 292/122; 292/123; 292/126; 292/222; 292/223; 292/DIG. 11; 292/DIG. 22

(58) Field of Classification Search ........ 292/DIG. 22, 292/122, 123, 126, 96, 97, 207, 222, 223, 292/199, DIG. 12, DIG. 11, 112, 113, 109, 292/110, 51, 56, 95, 107, 129, 144, 280, 64, 292/201

See application file for complete search history.

(56) References Cited

U.S. PATENT DOCUMENTS

| | | | | |
|---|---|---|---|---|
| 985,995 | A * | 3/1911 | Graham | 160/290.1 |
| 1,272,327 | A * | 7/1918 | Bisaillon | 292/122 |
| 3,403,934 | A * | 10/1968 | Butts | 292/341.16 |
| 3,504,511 | A * | 4/1970 | Allen | 70/241 |
| 3,566,703 | A * | 3/1971 | Van Noord | 74/50 |
| 3,806,174 | A * | 4/1974 | Herman | 292/113 |
| 3,831,580 | A * | 8/1974 | McLean | 126/197 |
| 4,593,945 | A * | 6/1986 | Arute et al. | 292/201 |
| 4,607,388 | A | 8/1986 | Koiymaki et al. | |
| 4,652,027 | A * | 3/1987 | Quantz | 292/201 |
| 4,707,007 | A * | 11/1987 | Inoh | 292/341.16 |
| 4,776,619 | A * | 10/1988 | Daugherty et al. | 292/108 |
| 4,796,932 | A * | 1/1989 | Tame | 292/112 |
| 4,848,809 | A * | 7/1989 | Escaravage | 292/11 |
| 4,951,979 | A * | 8/1990 | Escaravage | 292/110 |
| 4,984,833 | A | 1/1991 | Knurr | |
| 5,029,910 | A * | 7/1991 | Genbauffe et al. | 292/110 |
| 5,072,974 | A * | 12/1991 | Henne | 292/126 |
| 5,440,103 | A * | 8/1995 | Martin | 219/413 |
| 5,582,448 | A | 12/1996 | Inoue | |
| 5,639,130 | A * | 6/1997 | Rogers et al. | 292/216 |

(Continued)

FOREIGN PATENT DOCUMENTS

DE    0162522    11/1904

(Continued)

*Primary Examiner*—Brian E. Glessner
*Assistant Examiner*—Carlos Lugo
(74) *Attorney, Agent, or Firm*—Abelman, Frayne & Schwab

(57) ABSTRACT

A device for locking a closure (2) with a housing includes at least one swiveling lever (8), a drive (19) for pivoting the at least one swiveling lever 98) about an axis of rotation and having teeth (20) which interact with teeth (10) provided on the marginal area of the swiveling lever extending around the axis of rotation, at least one catch hook (12) supported on the swiveling lever (8) and having a cam segment (14) concentric to the pivot axis (11) of the at least one catch hook and into which a guide element (9) provided on the swiveling lever (8) engages, and a spring (17) for biasing the at least one catch hook in a closing direction.

14 Claims, 2 Drawing Sheets

U.S. PATENT DOCUMENTS

| | | | | |
|---|---|---|---|---|
| 5,887,916 A | * | 3/1999 | Finkelstein et al. | 292/202 |
| 5,992,194 A | * | 11/1999 | Baukholt et al. | 292/201 |
| 6,315,336 B1 | * | 11/2001 | Swartzell | 292/201 |
| 6,327,879 B1 | * | 12/2001 | Malsom | 70/97 |
| 6,364,376 B1 | * | 4/2002 | Spargo | 292/97 |
| 6,402,208 B1 | * | 6/2002 | Shimizu | 292/123 |

FOREIGN PATENT DOCUMENTS

| | | |
|---|---|---|
| DE | 3337202 | 7/1991 |
| DE | 9736445 | 2/1998 |
| DE | 9812603 | 10/1998 |
| FR | 2651527 | 3/1991 |
| FR | 2683251 | 5/1993 |

* cited by examiner

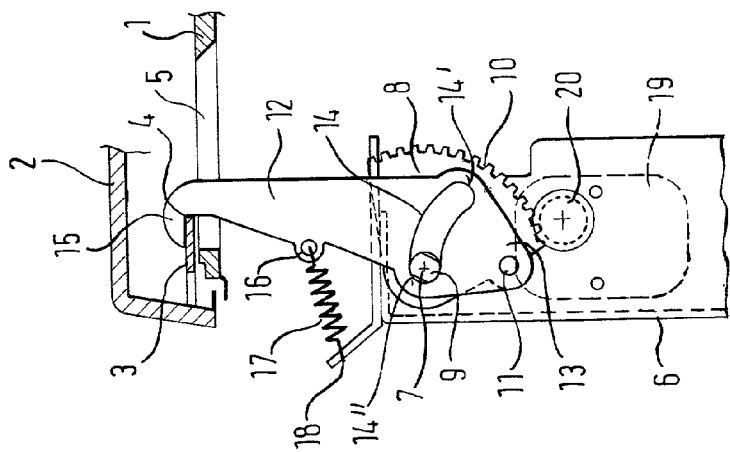
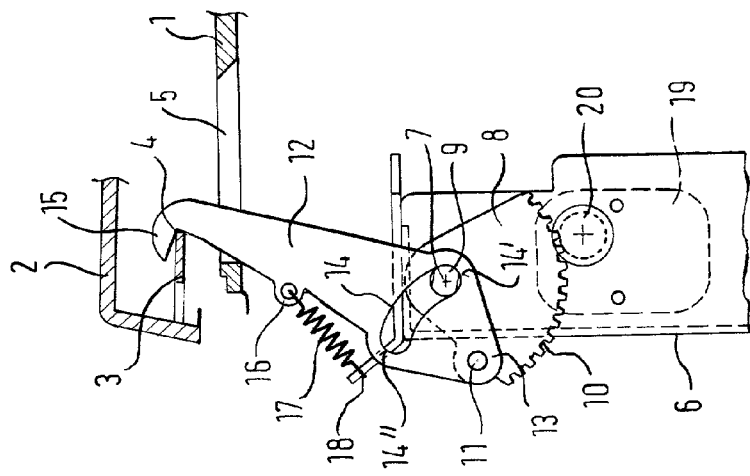
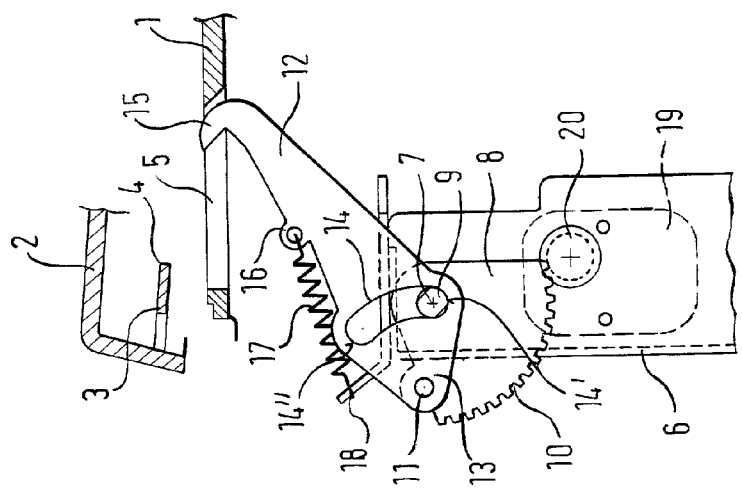

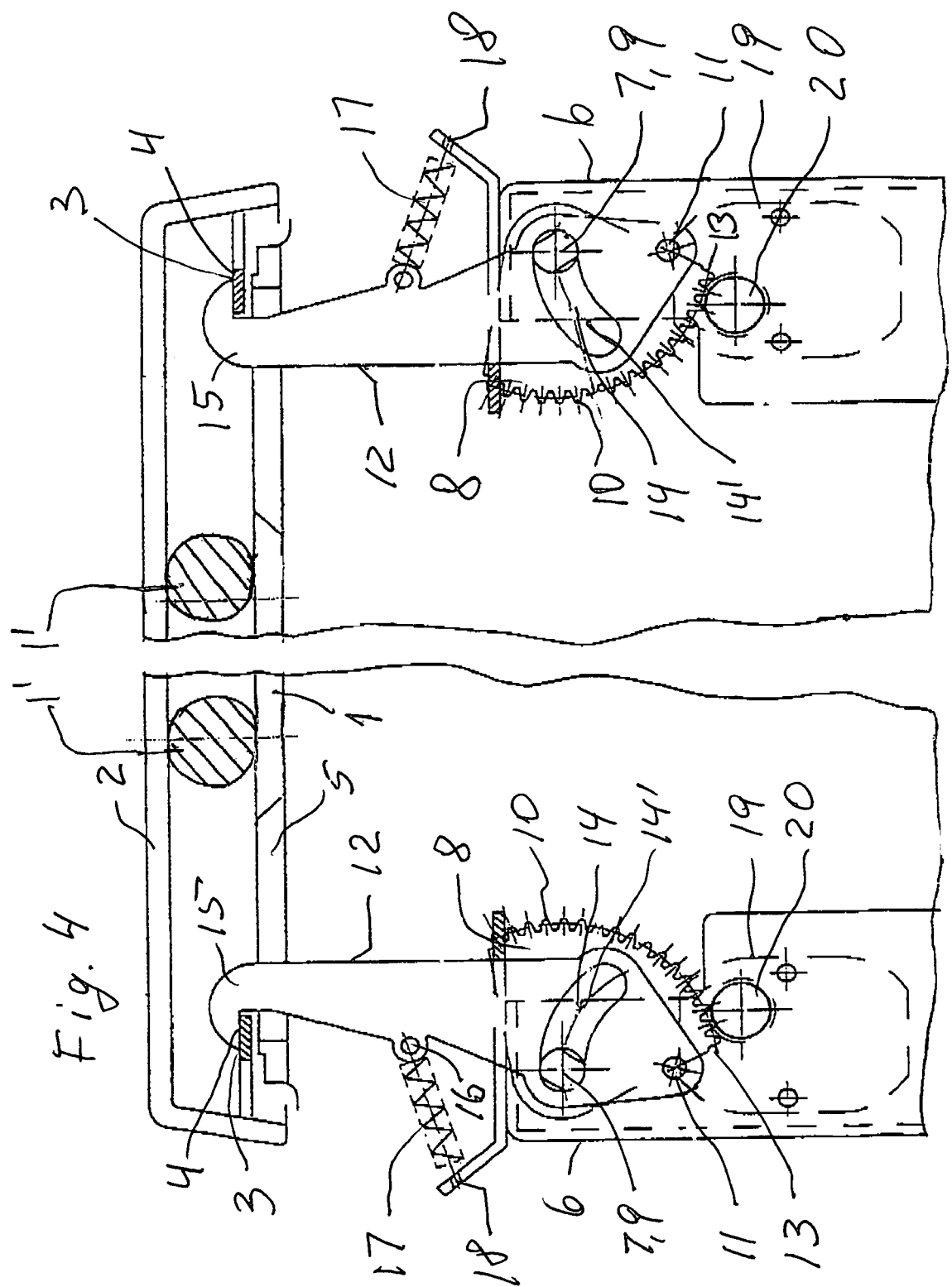

LOCKING DEVICE OF A CLOSURE WITH A HOUSING

BACKGROUND OF THE INVENTION

1. Field of the Invention

This invention relates to a device for locking a closure with a housing, particularly of a laboratory centrifuge.

2. Description of the Prior Art

Laboratory centrifuges require to be safely locked when in operation in order to avert dangers of accident caused by a contact with the rotor rotating at a high speed or with content which is centrifuged out. A safe device for locking a closure with a housing is also necessary in many other devices. For example, it can be used with the front flap of a washing machine or the trunk lid of a motor vehicle.

From EP 0 952 385 A2, a safety lock for s has been known, particularly for centrifuges, wherein at least one holder element is passed through the lid underside and is releasably secured within the housing.

The holder element having a hook shape can be pivoted by a strip handle that it partly positively grips around a closing bolt within the housing. When the lid is in a closed condition, a locking pin positively engages a notched pawl of the holder element as long as the rotor rotates. The locking pin is moved into or out of the notched pawl by an actuating element which is driven by the device control in dependence on the working order. Actuating the holder element manually involves an expenditure of force and, moreover, the holder element permanently projects from the lid underside.

Furthermore, EP 0 154 983 A2 discloses a device to keep the door of a centrifuge wherein several hydraulic or pneumatic hook elements which are adapted to be moved into a locking position and an opening position, are mounted on the centrifuge housing and when in the locking position, engage receiver elements which are mounted on the door which is to be kept closed. The receiver elements also are of a hook shape and permanently project beyond the lid underside. The movable hook-shaped elements are pivotally supported on an axle fixed to the housing and project beyond the outer housing edge even if the door is opened.

Generally, manually operable locking devices for lids or other closures require a relative large expenditure of forces in closing and sealing the lid. The known locking devices will close only if the lid is kept in a closing position where a sealing element, which possibly exists requires to be elastically squeezed. Moreover, the known locking devices have hooks or eyelets protruding beyond the housing or the lid, which impede their use or may cause accidents.

Accordingly, it is the object of the invention to provide a device for locking a closure with a housing, particularly designed as a lid locking device of laboratory centrifuges, which exhibits an increased operational comfort and has no locking elements which project beyond lids or housings.

SUMMARY OF THE INVENTION

The inventive device for locking a closure with a housing, particularly of a laboratory centrifuge, comprises at least one swiveling lever pivotally supported about an axis of rotation in the housing including a projecting guide element, at least one drive to pivot the swiveling lever about the axis of rotation, at least one catch hook supported on the swiveling lever at a distance from the axis of rotation on a pivot axis which, at a radial distance from the pivot axis, has a cam segment concentric thereto, into which the guide element of the swiveling lever engages, at least one spring means biasing the catch hook in the closing direction until the guide element bears against a first final stop of the cam segment, and at least one closing edge adapted to be gripped over on the closure so that if the catch hook is in an opening position and the swiveling lever is pivoted in the closing direction the spring means holds the catch hook with the first final stop on the guide element in order to pivot the catch hook with the swiveling lever in the closing direction. If the catch hook impinges on the closing edge and the swiveling lever continues to be pivoted in the closing direction the guide element will move, within the cam segment, to its second final stop so that the swiveling lever moves the pivot axis with the catch hook in the closing direction of the closure and, thus, the catch hook pulls the closure into the closing position.

In this locking device, the locking procedure is broken up into two phases:

In the first phase, the catch hook is pivoted with the swiveling lever until it impinges on the closing edge of the closure. Then, the second phase begins in which the swiveling lever moves the catch hook downwards and, thus, pulls the closure into the closing position. Such kinematics makes it possible to arrange the swiveling lever, in the aperture position, so as to be completely pivoted into the housing and to form the closing edge on an element which is accessible from the underside of the closure, but does not project therefrom. This means that the housing or the closure do not have projecting elements that are annoying or apt to cause accidents. In addition, the locking device is of a high operational comfort because a substantial expenditure of force in closing and sealing the closure is unnecessary. The kinematics permits to grip the closure with no need for it to be completely closed. At this point, the locking device constitutes some sort of kinematic sensor which pulls the closure onto the seal or into a closing position if the catch hook impinges on the closing edge of the closure. This motion of the closure can also be performed by means of the swiveling lever, with a reduced expenditure of force.

According to an advantageous aspect, the swiveling lever may substantially have a circle segment shape which, in particular, provides a large-surface rest for the catch hook and possible mountings for the guide element and the pivot axis. According to a advantageous further aspect of the present invention, the axis of rotation is disposed in the inner angular range of the circle segment-shaped swiveling lever. An advantageous further aspect provides for the pivot axis to be disposed in the vicinity of a lateral limitation of the circle segment-shaped swiveling lever. Besides, the external border of the circle segment-shaped swiveling lever may be utilized to accommodate a series of teeth which interacts with a series of teeth of the drive. According to a further aspect of the present invention, the swiveling lever may have such a series of teeth on a marginal area extending around the axis of rotation in a circular arc shape.

According to a still further aspect of the present invention which is formed as particularly simple, the guide element is a guide pin projecting from the swiveling lever. The guide element may be disposed at a distance from the axis of rotation for supporting the swiveling lever. According to an advantageous aspect of the present invention, however, the guide element is defined by an extension of the axis of rotation for supporting the swiveling lever.

The drive of the swiveling lever basically may be a manual drive. According to an aspect of the present invention, however, a maximum operational comfort is achieved by using an electric motor as a drive. The fixation of the catch hook in the closing position may be caused or enhanced by a self-locking device or an additional blocking device of a driving transmission. As a blocking device, a driving motor may have a circuit which enables to short-circuit the driving motor in the locking case in order to enhance the self-locking device action. However, there can also be a blocking device mechanically engaging the driving transmission, which can be realized in a relatively easy manner because of the self-locking action thereof.

According to a practical aspect of the invention, the catch hook may have a widened base in which the pivot axis is supported and which, between the pivot axis and a neck with the hooked end of the catch hook, includes the cam segment. Furthermore, the catch hook may have a fixing point for the spring element between the cam segment and the hooked end. The spring element may particularly act between the catch hook and the swiveling lever. According to an advantageous further aspect, however, it will be active between the catch hook and a fixed point on the housing.

The catch hook is adapted to be moved through a slot-shaped aperture in the upper side of the housing, which enables the catch hook to be displaced perpendicular to the upper side of the housing and parallel thereto. Basically, the locking device may be disposed so that the catch hook always projects approximately beyond the upper side of the housing. Particularly advantageous, however, is an accommodation in which the catch hook, in an opening position, does not project beyond the upper side of the housing.

Basically, the closing edge may also be accommodated on a projecting element of the closure. According to a particularly advantageous further aspect, however, the closing edge is in a region which stands back with respect to the underside of the closure.

Basically, the locking device is suited for closures which are led to the housing in any motion desired. Particularly advantageous, however, is the locking device for a closure pivotally supported on the housing. It is preferred that the locking device be mounted at a distance from the pivot axis of the closure. In any case, one or more locking devices may exist for the closure. A single locking device may be sufficient, however, particularly with a pivotally supported closure.

According to another aspect of the invention, in the locking device for a pivotally supported closure, however, the catch hook may impinge its hooked end on the closing edge in a pivoted position of the closure which is merely a few angular degrees. Then, the closure may only be pivoted so as to close approximately in order to create the prerequisite for a locking device. If the closure continues to be pivoted so as to close more this causes no harm because it will then also be ensured that the catch hook impinges on the closing edge, thus initiating the pull of the lid into the closing position.

According to an advantageous further aspect, the closure is pulled by the catch hook against a seal between the closure and the housing.

According to a particularly advantageous further aspect of the present invention, a self-locking action of the closing mechanism in the closing position may be achieved by moving the pivot axis, in the closing position, beyond a straight line extending through the point of rest of the hooked end on the closing edge and through the guide element.

Finally, according to an advantageous still further aspect of the present invention, the device may have several catch hooks. These preferably are seated on spaced-apart housing portions in order to lock the closure as safely as possible. It is preferred that different catch hooks be disposed on different swiveling levers each of which may have a drive or driving motor of its own. The different swiveling levers, however, may also be connected to a common drive, e.g. via a shaft. Besides, it is possible to place several catch hooks onto various sides of the swiveling lever in order to grip over each closing edge twice.

The invention will now be explained in more detail with reference to the accompanying drawings which show one embodiment.

BRIEF DESCRIPTION OF THE DRAWINGS

FIG. 1 shows the locking device of a lid of a centrifuge in the opening position in a partial section through the lid and the housing;

FIG. 2 shows the same locking device while the catch hook impinges on the closing edge in the same view;

FIG. 3 shows the same locking device in a closing position in the same view;

FIG. 4 shows the same locking device as FIGS. 1–3 with several hooks in the closing position in the same view.

DETAILED DESCRIPTION OF THE PREFERRED EMBODIMENT

The locking device is formed on a laboratory centrifuge including a housing 1 and a lid 2 pivotally supported thereon for closing an upper side aperture of the housing 1 through which a centrifuge rotor is accessible. The drawings merely show a portion of housing 1 and lid 2 which is disposed at a spacing from the swivel bearing of the lid 2.

The lid 2 has a circumferential border which projects downwardly. It is at least from the border inside opposed to the swivel bearing of the lid 2 that an marginal portion 3 projects inwardly the inner border of which defines a closing edge 4.

In its horizontal upper side, the housing 1 has a slot 5 which extends in a direction transverse to the swivel bearing of the lid 2. The slot 5 starts approximately at the level of the closing edge 4 if the lid 2 is in a closing position and ends at a larger distance from the closing edge 4.

Within the housing 1, approximately below the slot 5, there are arranged more parts of the locking mechanism which interact with the closing edge 4 and are depicted in greater detail below:

In a frame structure 6 fixed to the housing, a an axis of rotation 7 is held transversely to the slot 5. This axis of rotation 7 pivotally supports a swiveling lever 8 which has substantially a circle segment shape. The axis of rotation 7 is in the inner angular range of the circle segment shaped swiveling lever. In addition, the axis of rotation 7 projects beyond the illustrated side of the swiveling lever 8 in a portion which defines a guide pin 9. Further, the substantially circle segment shaped border of the swiveling lever 8 is provided with a series of teeth 10.

On the same side of the swiveling lever 8 on which the guide pin 9 projects, the swiveling lever 8 carries a projecting pivot axis 11. The pivot axis 11 is disposed at a distance from the axis of rotation 7 in the vicinity of the series of teeth 10.

The pivot axis 11 supports a catch hook 12 having a base 13, which has substantially a circle segment shape as well.

At this point, the pivot axis 11 is in the inner angular range of the base 13. Near the outer border of the base 13, the catch hook 12 has a cam segment 14 which is concentric to the pivot axis 11 and is engaged by the guide pin 9.

The catch hook 12 further has a neck originating from the base 13, which carries a hooked end 15. The catch hook 12 is adapted to be moved in a vertical plane extending through the slot 5 where it particularly may bring its hooked end 15 in engagement with the slot 5 or may grip through the slot 5.

On the left-hand side in the drawing, the catch hook 12 has a bearing eyelet 16 on which a helical spring 17 is supported. The other end of the helical spring 17 is held on a bearing point 18 of the frame structure 6 fixed to the housing. The arrangement of the spring element 17 is such that it will be above the pivot axis 11 in any position of the locking mechanism so that it always seeks to pull the catch hook 12, in a counter-clockwise sense, into a position in which the guide pin 9 strikes against the first final stop 14', the right-hand one in the drawing, of the guide cam segment 14.

Finally, the locking mechanism has an electric driving motor 19 which also is firmly supported on the housing and has a rotary driving gear 20 whose series of teeth meshes with the series of teeth 10 of the swiveling lever 8.

The locking devices operates as follows:

In the opening position shown in FIG. 1, the driving motor 19 has pivoted the swiveling lever 8 clockwise about the axis of rotation 7 until a final position is reached in which the gear 20 approximately has reached the one end of the series of teeth 10. In this position, the biased helical spring 17 pulls the catch hook 12 counter-clockwise so that the guide pin 9 abuts against the first final stop 14 of the cam segment 14'.

To close the lid 2, it first is manually pivoted to the housing 1 until it gets into an angular position of about 5° with respect to the housing 1, which is shown in FIG. 1.

To lock the lid 2, the driving motor 19 drives the swiveling lever 8 about the axis of rotation 7 in a counter-clockwise direction. The helical spring 17 causes the catch hook 12 to continue abutting its first final stop 14' against the guide pin 9. Consequently, the catch hook 12 is pivoted along about the axis of rotation 7 with its hooked end 15 exiting from the upper side of the slot 5. The catch hook 12 is pivoted along until its hooked end 15 impinges on the closing edge 4 of the lid 2, as shown in FIG. 2.

As soon as the catch hook 12 impinges on the closing edge 4 this one becomes the new fulcrum of the catch hook 12. If the swiveling lever 8 continues to be pivoted counter-clockwise the catch hook 12 consequently is pulled downwardly on the pivot axis 11 and the guide pin 9 in the cam segment 14 is moved towards the second final stop 14" which is the left-hand one in the drawing. The downward motion of the catch hook 12 causes the lid 2 to be sealingly pulled against a seal 1' at the upper side of the housing 1 over the closing edge 4 and, hence, to be closed. The closing motion ends when the gear 20 approximately has arrived, in a clockwise sense, at the outermost end of the series of teeth 10. Then, the pivot axis 11 has been pivoted by the closing edge 4 and the guide pin 9 beyond the prolongation of a straight line, which results in a self-locking effect. At this point, the guide pin 9 preferably bears against the second final stop 14" of the cam segment 14. Basically, however, it is also possible that the guide pin 9, in a closing position, does not reach the second final stop 14".

Another contribution to a self-locking action is achieved by means of the driving transmission. Further, the electric driving motor 19 is shortcircuited with a view to securing the catch lever 12 in the closing position of FIG. 3.

To unlock the lid 2, the driving motor 19 is operated in a reverse sense so that the course of operations described above is performed in an inverse direction.

The invention claimed is:

1. A device for locking a closure (2) with a housing of a laboratory centrifuge, the locking device comprising:
   at least one swiveling lever (8) pivotally supported about an axis of rotation (7) in the housing (1) and including a projecting guide element (9);
   at least one drive (19) for pivoting at least one swiveling liver (8) about the axis of rotation (7);
   at least one catch hook (12) supported on the swiveling lever (8) at a distance from the axis of rotation (7) on a pivot axis (11) and having at a radial distance from the pivot axis (11), a cam segment (14) concentric thereto, into which the guide element (9) of the swiveling lever (8) engages, the cam segment (14) forming opposite first final stop (14') and second final stop (14"); and
   at least one spring means (17) for biasing the at least one catch hook (12) in a closing direction thereof,
   wherein the closure (2) has at least one closing edge (4) which is gripped upon the closure being locked with the housing (1) by the at least one catch hook (12), wherein with the at least one swiveling lever (8) being pivoted in the closing direction, the at least one spring means (17) pull the at least one catch hook (12) to a position in which the first final stop (14') lies on the guide element (9) to provide for pivoting the at least one catch hook in the closing direction thereof with the at least one swiveling lever (8), wherein with the at least one catch hook (12) impinging on the closing edge (4) and with the swiveling lever (8) still being pivoted in the closing direction until the guide element (9) moves within the cam segment (14) to the second final stop (14") thereof, the at least one swiveling lever (8) moves the pivot axis (11) with the at least one catch hook (12) in the closing direction, with the at least one catch hook (12) pulling the closure (2) into a closing position thereof, and wherein the at least on swiveling lever (18) has on a marginal area extending around the axis of rotation and having a circle arc shape, a series of teeth (10) which interact with a series of teeth (20) of the at least one drive (19) for pivoting the at least one swiveling lever (8) about the axis of rotation (7).

2. The locking device according to claim 1, wherein the at least one swiveling lever (8) has substantially a circle segment shape.

3. The locking device according to claim 2, wherein the axis of rotation (7) is disposed in an inner angular range of the circle segment-shaped lever (8), and wherein the pivot axis (11) of the at least one hook (12) is disposed in vicinity of a lateral limitation of the circle segment-shaped swiveling lever (8).

4. The locking device according to claim 1, wherein the guide element (19) is formed as a guide pin.

5. The locking device according to claim 4, wherein the guide pin (9) is defined by an extension of the axis of rotation (7) of the at least one swiveling lever (8).

6. The locking device according to claim 1, wherein the at least one drive (19) comprises an electric motor.

7. The locking device according to claim 1, wherein the at least one swiveling catch hook (12) has a widened base (13) in which the pivot axis (11) of the at least one hook is supported and in which, between the pivot axis and an adjoining neck with hook end (15), the cam segment (14) is arranged.

8. The locking device according to claim 7, wherein the at least one catch hook (12) has a fixing point (16) for a spring element (17) between the cam segment (14) and the hook end (15).

9. The locking device according to claim 8, wherein the spring element (17) is held at another end thereof, on the housing (1).

10. The locking device according to claim 1, wherein the at least one catch hook (12) is adapted to be moved through a slot-shaped aperture (5) in an upper side of the housing (1) which enables the at least one catch hook (12) to be displaced perpendicular to the upper side of the housing (1) and parallel thereto.

11. The locking device according to claim 10, wherein the at least one catch hook (12), does not substantially project beyond the upper side of the housing (1).

12. The locking device according to claim 1, wherein the at least one catch hook (12) impinges with a hooked end (15) thereof on the closing edge (4) in a pivoted position of the closure (2) which amounts to a few angular degrees.

13. The locking device according to claim 1, wherein the pivot axis (11) of the at least one catch hook (12) in the closing position, has been moved beyond a straight line extending through a point of rest of a hooked end (15) on the closing edge (4) and through the guide element (9) to cause a self-locking action.

14. The locking device according to claim 1, comprising several catch hooks.

* * * * *